United States Patent
Slattery et al.

(10) Patent No.: US 12,543,936 B2
(45) Date of Patent: Feb. 10, 2026

(54) SYSTEMS AND METHODS FOR PREVENTING CLOGGING OF A DELIVERY SYSTEM

(71) Applicant: Cook Medical Technologies LLC, Bloomington, IN (US)

(72) Inventors: David Slattery, Limerick (IE); Inga Rosca, Limerick (IE); Jack Collins, County Clare. (IE); Jennifer O'Malley, County Limerick (IE); Dillon McCarthy, Clare (IE)

(73) Assignee: COOK MEDICAL TECHNOLOGIES LLC, Bloomington, IN (US)

( * ) Notice: Subject to any disclaimer, the term of this patent is extended or adjusted under 35 U.S.C. 154(b) by 874 days.

(21) Appl. No.: 17/860,391

(22) Filed: Jul. 8, 2022

(65) Prior Publication Data

US 2023/0016512 A1  Jan. 19, 2023

Related U.S. Application Data

(60) Provisional application No. 63/221,721, filed on Jul. 14, 2021.

(51) Int. Cl.
*A61J 1/20* (2006.01)
*A61B 1/00* (2006.01)
*A61B 1/015* (2006.01)

(52) U.S. Cl.
CPC .......... *A61B 1/015* (2013.01); *A61B 1/00068* (2013.01); *A61J 1/2058* (2015.05)

(58) Field of Classification Search
CPC .............. A61M 5/155; A61M 5/16881; A61M 5/5422; A61M 2005/14513;

(Continued)

(56) References Cited

U.S. PATENT DOCUMENTS

| 39,678 A | 8/1863 | Russell |
| 170,182 A | 11/1875 | Molesworth |

(Continued)

FOREIGN PATENT DOCUMENTS

| AU | 9382598 | 3/1999 |
| AU | 2009244462 | 11/2009 |

(Continued)

OTHER PUBLICATIONS

International Preliminary Report on Patentability in PCT Application No. PCT/US2022/047013, dated Apr. 30, 2024 (12 pages).

(Continued)

*Primary Examiner* — Cris L. Rodriguez
(74) *Attorney, Agent, or Firm* — Vivacqua Crane, PLLC (57) ABSTRACT

A system suitable for delivering a therapeutic agent to a target site may include a container for holding a therapeutic agent, a pressure source having pressurized fluid, where the pressure source is in selective fluid communication with at least a portion of the container, a catheter in selective fluid communication with the container and configured for delivery of the therapeutic agent to a target site, a first valve connected between the container and the catheter, a second valve connected between the pressure source and the container, a button configured to selectively actuate the second valve, and a brake assembly coupled to the first valve and configured to selectively permit actuation of the second valve, such that when the first valve is in a first state, the brake assembly blocks the button such that the button does not actuate the second valve.

20 Claims, 6 Drawing Sheets

(58) Field of Classification Search
CPC ...... A61M 2039/226; A61M 2039/229; A61M 5/16827; A61M 11/02; A61M 13/00; A61M 2202/064; A61M 2205/8225; A61B 1/015; A61B 1/00068; A61J 1/2058
See application file for complete search history.

(56) References Cited

U.S. PATENT DOCUMENTS

| | | |
|---|---|---|
| 280,202 A | 6/1883 | Mattson |
| 442,785 A | 12/1890 | Schoettl |
| 460,458 A | 9/1891 | Bates |
| 471,865 A | 3/1892 | Howard |
| 533,489 A | 2/1895 | Ogram |
| 566,411 A | 8/1896 | Schoene |
| 576,437 A | 2/1897 | Elliot |
| 693,587 A | 2/1902 | Campbell |
| 775,985 A | 11/1904 | McKain |
| 881,238 A | 3/1908 | Hasbrouck |
| 904,149 A | 11/1908 | Rachmann |
| 938,648 A | 11/1909 | DeVilbiss |
| 1,022,601 A | 4/1912 | Rumberg et al. |
| 1,114,114 A | 10/1914 | Cochenour |
| 1,145,520 A | 7/1915 | Smith |
| 1,261,503 A | 4/1918 | Figgis |
| 1,357,452 A | 11/1920 | Hall |
| 1,466,119 A | 8/1923 | Claflin |
| 1,521,396 A | 12/1924 | Scott |
| 1,685,280 A | 9/1928 | Findley |
| 1,934,793 A | 11/1933 | Crain et al. |
| 2,004,402 A | 6/1935 | Conklin |
| 2,151,418 A | 3/1939 | Bolte |
| 2,223,611 A | 12/1940 | Gross |
| 2,307,986 A | 1/1943 | Bolte et al. |
| 2,390,313 A | 12/1945 | Macgill |
| 2,507,702 A | 5/1950 | Fields |
| 2,519,555 A | 8/1950 | Fields |
| 2,609,155 A | 9/1952 | Fosnaugh |
| 2,632,444 A | 3/1953 | Kas |
| 2,805,013 A | 9/1957 | Cordis |
| 2,934,314 A | 4/1960 | Chambers et al. |
| 2,956,579 A | 10/1960 | Moore et al. |
| 3,016,895 A | 1/1962 | Sein et al. |
| 3,050,261 A | 8/1962 | Littlefield |
| 3,207,618 A | 9/1965 | De Hart |
| 3,506,008 A | 4/1970 | Huck |
| 3,540,444 A | 11/1970 | Moreland |
| 3,572,335 A | 3/1971 | Robinson |
| 3,589,363 A | 6/1971 | Banko et al. |
| 3,599,866 A | 8/1971 | Bolton |
| 3,632,046 A | 1/1972 | Hengesbach |
| 3,647,143 A | 3/1972 | Gauthier et al. |
| 3,649,299 A | 3/1972 | Sholl |
| 3,667,465 A | 6/1972 | Voss |
| 3,710,400 A | 1/1973 | Sparks |
| 3,742,955 A | 7/1973 | Battista et al. |
| 3,744,493 A | 7/1973 | Booher et al. |
| 3,762,410 A | 10/1973 | Bindel |
| 3,788,315 A | 1/1974 | Laurens |
| 3,815,595 A | 6/1974 | Bar |
| 3,900,022 A | 8/1975 | Widran |
| 3,916,896 A | 11/1975 | Ballard |
| 4,009,637 A | 3/1977 | Bittner |
| 4,017,007 A | 4/1977 | Riccio |
| 4,040,420 A | 8/1977 | Speer |
| 4,174,811 A | 11/1979 | Binder et al. |
| 4,184,258 A | 1/1980 | Barrington et al. |
| 4,204,539 A | 5/1980 | Van Brugge |
| 4,204,645 A | 5/1980 | Hopp |
| 4,210,140 A | 7/1980 | James et al. |
| 4,359,049 A | 11/1982 | Redl et al. |
| 4,391,276 A | 7/1983 | Lazarus et al. |
| 4,423,727 A | 1/1984 | Widran et al. |
| 4,427,450 A | 1/1984 | Kostansek |
| 4,427,650 A | 1/1984 | Stroetmann |
| 4,516,442 A | 5/1985 | Davis |
| 4,534,345 A | 8/1985 | Wetterlin |
| 4,539,716 A | 9/1985 | Bell |
| 4,552,556 A | 11/1985 | Urquhart et al. |
| 4,578,067 A | 3/1986 | Cruz, Jr. |
| 4,606,501 A | 8/1986 | Bate et al. |
| 4,620,847 A | 11/1986 | Shishov et al. |
| 4,631,055 A | 12/1986 | Redl et al. |
| 4,637,816 A | 1/1987 | Mann |
| H257 H | 4/1987 | Barditch et al. |
| 4,655,211 A | 4/1987 | Sakamoto et al. |
| 4,657,536 A | 4/1987 | Dorman |
| 4,735,616 A | 4/1988 | Eibl et al. |
| 4,738,658 A | 4/1988 | Magro et al. |
| 4,738,740 A | 4/1988 | Pinchuk |
| 4,752,466 A | 6/1988 | Saferstein et al. |
| 4,790,819 A | 12/1988 | Li et al. |
| 4,798,606 A | 1/1989 | Pinchuk |
| 4,803,977 A | 2/1989 | Kremer, Jr. |
| 4,846,405 A | 7/1989 | Zimmermann |
| 4,850,355 A | 7/1989 | Brooks et al. |
| D303,139 S | 8/1989 | Morgan |
| 4,872,450 A | 10/1989 | Austad |
| 4,874,368 A | 10/1989 | Miller et al. |
| 4,890,612 A | 1/1990 | Kensey |
| 4,900,303 A | 2/1990 | Lemelson |
| 4,902,278 A | 2/1990 | Maget et al. |
| 4,902,281 A | 2/1990 | Avoy |
| 4,927,410 A | 5/1990 | Kovacs |
| 4,929,246 A | 5/1990 | Sinofsky |
| 4,941,874 A | 7/1990 | Sandow et al. |
| 4,941,880 A | 7/1990 | Burns |
| 4,945,050 A | 7/1990 | Sanford et al. |
| 4,946,870 A | 8/1990 | Partain, III et al. |
| 4,950,234 A | 8/1990 | Fujioka et al. |
| 4,969,874 A | 11/1990 | Michel et al. |
| 4,978,336 A | 12/1990 | Capozzi et al. |
| 4,994,028 A | 2/1991 | Leonard et al. |
| 5,009,637 A | 4/1991 | Newman et al. |
| 5,015,580 A | 5/1991 | Christou et al. |
| 5,021,059 A | 6/1991 | Kensey et al. |
| 5,053,000 A | 10/1991 | Booth et al. |
| 5,059,187 A | 10/1991 | Sperry et al. |
| 5,061,180 A | 10/1991 | Wiele |
| 5,063,025 A | 11/1991 | Ito |
| 5,064,413 A | 11/1991 | McKinnon et al. |
| 5,106,370 A | 4/1992 | Stewart |
| 5,116,315 A | 5/1992 | Capozzi et al. |
| 5,120,657 A | 6/1992 | McCabe et al. |
| 5,129,825 A | 7/1992 | Discko, Jr. |
| 5,129,882 A | 7/1992 | Weldon et al. |
| 5,133,701 A | 7/1992 | Han |
| 5,135,484 A | 8/1992 | Wright |
| 5,141,515 A | 8/1992 | Eberbach |
| 5,147,292 A | 9/1992 | Kullas et al. |
| 5,149,655 A | 9/1992 | McCabe et al. |
| 5,165,604 A | 11/1992 | Copp, Jr. |
| 5,176,642 A | 1/1993 | Clement |
| 5,179,022 A | 1/1993 | Sanford et al. |
| D333,000 S | 2/1993 | Good et al. |
| 5,204,253 A | 4/1993 | Sanford et al. |
| 5,207,641 A | 5/1993 | Allton |
| 5,219,328 A | 6/1993 | Morse et al. |
| 5,226,567 A | 7/1993 | Sansalone |
| 5,226,877 A | 7/1993 | Epstein |
| RE34,365 E | 8/1993 | Theeuwes |
| 5,273,531 A | 12/1993 | Knoepfler |
| 5,292,309 A | 3/1994 | Van Tassel et al. |
| 5,310,407 A | 5/1994 | Casale |
| 5,312,331 A | 5/1994 | Knoepfler |
| 5,312,333 A | 5/1994 | Churinetz et al. |
| 5,328,459 A | 7/1994 | Laghi |
| 5,330,426 A | 7/1994 | Kriesel et al. |
| 5,337,740 A | 8/1994 | Armstrong et al. |
| 5,391,183 A | 2/1995 | Janzen et al. |
| 5,392,992 A | 2/1995 | Farnsteiner et al. |
| 5,395,326 A | 3/1995 | Haber et al. |
| 5,405,607 A | 4/1995 | Epstein |
| 5,415,631 A | 5/1995 | Churinetz et al. |
| 5,429,278 A | 7/1995 | Sansalone |

(56) References Cited

U.S. PATENT DOCUMENTS

| | | |
|---|---|---|
| 5,445,612 A | 8/1995 | Terakura et al. |
| 5,447,499 A | 9/1995 | Allaire et al. |
| 5,469,994 A | 11/1995 | Reh et al. |
| 5,470,311 A | 11/1995 | Setterstrom et al. |
| 5,484,403 A | 1/1996 | Yaokum et al. |
| 5,497,232 A | 3/1996 | Watano et al. |
| 5,503,623 A | 4/1996 | Tilton, Jr. |
| 5,513,630 A | 5/1996 | Century |
| 5,518,546 A | 5/1996 | Williams et al. |
| 5,520,658 A | 5/1996 | Holm |
| 5,520,667 A | 5/1996 | Roche |
| 5,538,162 A | 7/1996 | Reh et al. |
| 5,546,932 A | 8/1996 | Galli |
| 5,553,741 A | 9/1996 | Sancoff et al. |
| 5,558,646 A | 9/1996 | Roche |
| 5,582,596 A | 12/1996 | Fukunaga et al. |
| 5,584,807 A | 12/1996 | McCabe |
| 5,584,815 A | 12/1996 | Pawelka et al. |
| 5,594,987 A | 1/1997 | Century |
| 5,601,603 A | 2/1997 | Illi |
| 5,605,541 A | 2/1997 | Holm |
| 5,612,050 A | 3/1997 | Rowe et al. |
| 5,665,067 A | 9/1997 | Linder et al. |
| 5,697,947 A | 12/1997 | Wolf et al. |
| 5,707,402 A | 1/1998 | Heim |
| 5,749,968 A | 5/1998 | Melanson et al. |
| 5,759,171 A | 6/1998 | Coelho |
| 5,788,625 A | 8/1998 | Plouhar et al. |
| 5,865,796 A | 2/1999 | McCabe |
| 5,873,530 A | 2/1999 | Chizinsky |
| 5,882,332 A | 3/1999 | Wijay |
| 5,895,400 A | 4/1999 | Abela |
| 5,902,228 A | 5/1999 | Schulsinger et al. |
| 5,919,184 A | 7/1999 | Tilton, Jr. |
| 5,951,531 A | 9/1999 | Ferdman et al. |
| 6,007,515 A | 12/1999 | Epstein et al. |
| 6,013,050 A | 1/2000 | Bellhouse et al. |
| 6,021,776 A | 2/2000 | Allred et al. |
| 6,027,471 A | 2/2000 | Fallon et al. |
| 6,059,749 A | 5/2000 | Marx |
| 6,077,217 A | 6/2000 | Love et al. |
| 6,117,150 A | 9/2000 | Pingleton et al. |
| 6,123,070 A | 9/2000 | Bruna |
| 6,158,624 A | 12/2000 | Grigg et al. |
| 6,165,201 A | 12/2000 | Sawhney et al. |
| 6,368,300 B1 | 4/2002 | Fallon et al. |
| 6,394,975 B1 | 5/2002 | Epstein |
| 6,428,505 B1 | 8/2002 | Taylor |
| 6,454,786 B1 | 9/2002 | Holm et al. |
| 6,461,325 B1 | 10/2002 | Delmotte et al. |
| 6,461,361 B1 | 10/2002 | Epstein |
| 6,478,754 B1 | 11/2002 | Babeav |
| 6,537,246 B1 | 3/2003 | Unger et al. |
| 6,554,792 B2 | 4/2003 | Hughes et al. |
| 6,610,026 B2 | 8/2003 | Cragg et al. |
| 6,616,652 B1 | 9/2003 | Harper |
| 6,641,800 B1 | 11/2003 | Mistry et al. |
| 6,689,108 B2 | 2/2004 | Lavi et al. |
| 6,716,190 B1 | 4/2004 | Glines et al. |
| 6,723,067 B2 | 4/2004 | Nielson |
| 6,811,550 B2 | 11/2004 | Holland et al. |
| 6,843,388 B1 | 1/2005 | Hollars |
| 6,863,660 B2 | 3/2005 | Marx |
| 6,905,475 B2 | 6/2005 | Hauschild et al. |
| 6,913,596 B2 | 7/2005 | Davey |
| 6,939,324 B2 | 9/2005 | Gonnelli et al. |
| 7,101,862 B2 | 9/2006 | Chochrum et al. |
| 7,178,744 B2 | 2/2007 | Tapphorn et al. |
| 7,182,748 B1 | 2/2007 | Potter et al. |
| 7,334,598 B1 | 2/2008 | Hollars |
| 7,455,248 B2 | 11/2008 | Kablik et al. |
| 7,534,449 B2 | 5/2009 | Saltzman et al. |
| 7,544,177 B2 | 6/2009 | Gertner |
| 7,547,292 B2 | 6/2009 | Sheldrake et al. |
| 7,588,171 B2 | 9/2009 | Reedy et al. |
| 7,632,245 B1 | 12/2009 | Cowan et al. |
| 7,648,083 B2 | 1/2010 | Hornsby et al. |
| 7,691,244 B2 | 4/2010 | Levitan et al. |
| 7,744,526 B2 | 6/2010 | McAlister et al. |
| 7,776,822 B2 | 8/2010 | Terman |
| 7,824,373 B2 | 11/2010 | Kim |
| 7,914,517 B2 | 3/2011 | Baran et al. |
| 8,083,721 B2 | 12/2011 | Miller |
| 8,109,872 B2 | 2/2012 | Kennedy, II et al. |
| 8,118,772 B2 | 2/2012 | Ducharme |
| 8,118,777 B2 | 2/2012 | Ducharme et al. |
| 8,210,449 B2 | 7/2012 | Peterson et al. |
| 8,235,937 B2 | 8/2012 | Palasis et al. |
| 8,292,197 B2 | 10/2012 | Ballu et al. |
| 8,298,175 B2 | 10/2012 | Hirschel et al. |
| RE43,824 E | 11/2012 | Sheldrake et al. |
| 8,361,054 B2 | 1/2013 | Ducharme et al. |
| 8,372,092 B2 | 2/2013 | Gabel et al. |
| 8,418,775 B2 | 4/2013 | Blomet et al. |
| 8,523,821 B2 | 9/2013 | Miller |
| 8,721,582 B2 | 5/2014 | Ji |
| 8,728,032 B2 | 5/2014 | Ducharme et al. |
| 8,827,980 B2 | 9/2014 | Ji |
| 8,944,296 B2 | 2/2015 | Vogt et al. |
| 8,950,396 B2 | 2/2015 | Wachtel et al. |
| 9,101,744 B2 | 8/2015 | Ducharme |
| 9,205,207 B2 | 12/2015 | Ji |
| 9,205,240 B2 | 12/2015 | Greenhalgh et al. |
| 9,375,533 B2 | 6/2016 | Ducharme et al. |
| 9,393,583 B2 | 7/2016 | Tu |
| 9,474,915 B2 | 10/2016 | Gonzales et al. |
| 9,486,609 B2 | 11/2016 | Ross |
| 9,555,185 B2 | 1/2017 | Foster et al. |
| 9,629,966 B2 | 4/2017 | Ji |
| 9,839,772 B2 | 12/2017 | Ducharme |
| 9,867,931 B2 | 1/2018 | Gittard |
| 9,895,527 B2 | 2/2018 | Spohn et al. |
| 9,907,456 B2 | 3/2018 | Miyoshi |
| 10,463,811 B2 | 11/2019 | Lee et al. |
| 10,542,868 B2 | 1/2020 | Gordon et al. |
| 10,610,665 B2 | 4/2020 | Krueger et al. |
| 10,806,853 B2 | 10/2020 | Gittard |
| 10,842,368 B2 | 11/2020 | Nave |
| 10,994,110 B2 | 5/2021 | Ducharme |
| 11,344,314 B2 | 5/2022 | Tal et al. |
| 11,766,546 B2 | 9/2023 | Pic et al. |
| 2001/0056256 A1 | 12/2001 | Hughes et al. |
| 2002/0165483 A1 | 11/2002 | Miller |
| 2003/0032862 A1 | 2/2003 | Ota et al. |
| 2003/0069549 A1 | 4/2003 | Macmahon |
| 2004/0059283 A1 | 3/2004 | Kirwan et al. |
| 2004/0073863 A1 | 4/2004 | Mousley |
| 2004/0215135 A1 | 10/2004 | Sheldrake et al. |
| 2004/0262340 A1 | 12/2004 | Kress |
| 2005/0125002 A1 | 6/2005 | Baran et al. |
| 2005/0205087 A1 | 9/2005 | Kablik et al. |
| 2006/0100572 A1 | 5/2006 | DiMatteo et al. |
| 2006/0252993 A1 | 11/2006 | Freed |
| 2007/0005002 A1 | 1/2007 | Millman |
| 2007/0088317 A1 | 4/2007 | Hyde |
| 2007/0199824 A1 | 8/2007 | Hoerr et al. |
| 2008/0021374 A1 | 1/2008 | Kawata |
| 2008/0132891 A1 | 6/2008 | Nobis et al. |
| 2008/0287911 A1 | 11/2008 | El-Nounou et al. |
| 2009/0000615 A1 | 1/2009 | Pohlmann |
| 2009/0007904 A1 | 1/2009 | Schuster et al. |
| 2009/0030274 A1 | 1/2009 | Goldfarb et al. |
| 2009/0071470 A1 | 3/2009 | Abrams |
| 2009/0145982 A1 | 6/2009 | Blomet et al. |
| 2009/0155342 A1 | 6/2009 | Diegelmann et al. |
| 2009/0234227 A1 | 9/2009 | Punga |
| 2009/0240197 A1 | 9/2009 | Cowan et al. |
| 2009/0281486 A1 | 11/2009 | Ducharme |
| 2009/0326453 A1 | 12/2009 | Adams et al. |
| 2010/0101579 A1 | 4/2010 | Levy et al. |
| 2010/0121261 A1 | 5/2010 | Kablik et al. |
| 2010/0137796 A1 | 6/2010 | Perry et al. |
| 2010/0160897 A1 | 6/2010 | Ducharme et al. |
| 2010/0191185 A1 | 7/2010 | Miller |

(56) References Cited

U.S. PATENT DOCUMENTS

| | | |
|---|---|---|
| 2010/0305505 A1 | 12/2010 | Ducharme et al. |
| 2011/0178495 A1 | 7/2011 | Ji |
| 2011/0272438 A1 | 11/2011 | Vogt et al. |
| 2012/0116296 A1 | 5/2012 | Ducharme et al. |
| 2012/0136301 A1 | 5/2012 | Miller |
| 2013/0046278 A1 | 2/2013 | Ji |
| 2013/0059113 A1 | 3/2013 | Hatton et al. |
| 2013/0100801 A1 | 4/2013 | Allan et al. |
| 2013/0104884 A1 | 5/2013 | Vazales et al. |
| 2013/0110080 A1 | 5/2013 | Ducharme |
| 2014/0200402 A1 | 7/2014 | Snoke et al. |
| 2014/0207097 A1 | 7/2014 | Ji |
| 2014/0248437 A1 | 9/2014 | Schroeder et al. |
| 2014/0271491 A1 | 9/2014 | Gittard et al. |
| 2014/0296806 A1 | 10/2014 | Williams et al. |
| 2014/0346257 A1 | 11/2014 | Reetz, III et al. |
| 2015/0216516 A1 | 8/2015 | Steffen |
| 2015/0306317 A1 | 10/2015 | Ducharme et al. |
| 2017/0224762 A1 | 8/2017 | McIntosh et al. |
| 2017/0232141 A1 | 8/2017 | Surti et al. |
| 2017/0265879 A1 | 9/2017 | Washburn et al. |
| 2017/0296221 A1 | 10/2017 | DiCaprio et al. |
| 2018/0001067 A1 | 1/2018 | Christakis et al. |
| 2018/0056052 A1 | 3/2018 | Swanson et al. |
| 2018/0099088 A1* | 4/2018 | Gittard ................. A61M 13/00 |
| 2018/0161526 A1 | 6/2018 | Canner et al. |
| 2018/0193011 A1 | 7/2018 | Keene et al. |
| 2018/0193574 A1 | 7/2018 | Smith et al. |
| 2018/0221296 A1 | 8/2018 | Holekamp et al. |
| 2018/0344659 A1 | 12/2018 | Holekamp et al. |
| 2019/0008601 A1 | 1/2019 | Pereira et al. |
| 2019/0232030 A1 | 8/2019 | Pic et al. |
| 2019/0308213 A1 | 10/2019 | Mispel-Beyer |
| 2019/0322442 A1 | 10/2019 | Thomsen |
| 2019/0343980 A1 | 11/2019 | Gittard et al. |
| 2019/0351207 A1 | 11/2019 | Quan et al. |
| 2019/0388665 A1 | 12/2019 | Christakis et al. |
| 2020/0046213 A1 | 2/2020 | Bendory et al. |
| 2020/0060536 A1 | 2/2020 | Rylander et al. |
| 2020/0061310 A1 | 2/2020 | Goodman et al. |
| 2020/0100986 A1* | 4/2020 | Pic ..................... G05D 16/0663 |
| 2020/0101476 A1 | 4/2020 | Pic et al. |
| 2020/0222218 A1 | 7/2020 | Poulsen et al. |
| 2020/0397983 A1 | 12/2020 | Gittard |
| 2021/0022761 A1 | 1/2021 | Looper et al. |
| 2021/0106717 A1 | 4/2021 | Carruthers et al. |
| 2021/0161515 A1 | 6/2021 | Pic et al. |
| 2021/0162122 A1 | 6/2021 | Pic et al. |
| 2021/0187190 A1 | 6/2021 | Congdon et al. |
| 2021/0228852 A1 | 7/2021 | Ducharme |
| 2021/0275760 A1 | 9/2021 | Hunter et al. |
| 2021/0299400 A1 | 9/2021 | Cauche et al. |
| 2021/0346568 A1 | 11/2021 | Gittard et al. |
| 2021/0379302 A1* | 12/2021 | Sigmon, Jr ....... A61M 25/0097 |
| 2022/0040006 A1 | 2/2022 | Surti et al. |
| 2023/0016512 A1 | 1/2023 | Slattery et al. |
| 2023/0390540 A1 | 12/2023 | Pic et al. |

FOREIGN PATENT DOCUMENTS

| | | |
|---|---|---|
| AU | 2009330505 | 6/2011 |
| AU | 2011202035 | 11/2011 |
| AU | 2010253997 | 12/2011 |
| AU | 2014237970 | 9/2015 |
| AU | 2014329827 | 4/2016 |
| BR | 112022023464.3 | 12/2022 |
| CA | 2194096 | 8/2005 |
| CA | 2723183 | 11/2009 |
| CA | 2747390 | 7/2010 |
| CA | 2751538 | 8/2010 |
| CA | 2763135 | 12/2010 |
| CA | 2585845 | 12/2012 |
| CA | 2925900 | 4/2015 |
| CA | 2737832 | 2/2016 |
| CH | 15244 A | 9/1897 |
| CH | 257250 A | 3/1949 |
| CN | 1010689555 A | 11/2007 |
| CN | 101820935 A | 9/2010 |
| CN | 105050630 A | 11/2015 |
| CN | 105792869 A | 7/2016 |
| CN | 201621061301.6 | 9/2016 |
| CN | 201820339550 | 3/2018 |
| CN | 110691615 A | 1/2020 |
| CN | 112546336 A | 3/2021 |
| CN | 113080819 A | 7/2021 |
| CN | 114514017 A | 5/2022 |
| CN | 115697176 A | 2/2023 |
| DE | 3024749 A1 | 2/1982 |
| DE | 3108918 A1 | 9/1982 |
| DE | 3613762 A1 | 11/1987 |
| DE | 69529495 | 3/2003 |
| DE | 69530843 | 6/2003 |
| DE | 10 2004 011 444 A1 | 9/2005 |
| DE | 60210063 | 5/2006 |
| DE | 602005005081 | 4/2008 |
| DE | 102010019222 | 11/2013 |
| EP | 308269 A1 | 3/1989 |
| EP | 0 692 273 | 1/1996 |
| EP | 0738498 A1 | 10/1996 |
| EP | 0690732 | 1/2003 |
| EP | 0767624 | 5/2003 |
| EP | 1293559 | 7/2005 |
| EP | 1550713 | 7/2005 |
| EP | 1365824 B1 | 3/2006 |
| EP | 1804926 | 2/2008 |
| EP | 2274039 | 1/2011 |
| EP | 2277577 | 1/2011 |
| EP | 2384871 | 11/2011 |
| EP | 2391411 | 12/2011 |
| EP | 2435114 | 4/2012 |
| EP | 2680912 | 8/2015 |
| EP | 2934629 | 10/2015 |
| EP | 2968651 | 1/2016 |
| EP | 3052168 | 5/2017 |
| EP | 3150240 | 5/2017 |
| EP | 2375960 | 10/2018 |
| EP | 3190981 | 11/2019 |
| EP | 3615094 | 3/2020 |
| EP | 4041196 | 8/2022 |
| EP | 4161346 | 4/2023 |
| FR | 2863503 | 12/2003 |
| FR | 2877240 | 1/2007 |
| GB | 10563 A | 12/1896 |
| GB | 1254534 A | 11/1971 |
| GB | 2300371 A | 11/1996 |
| GB | 0100756 | 3/2001 |
| JP | 4022109 B | 4/1992 |
| JP | 5-192404 | 8/1993 |
| JP | H08206229 | 8/1996 |
| JP | 1997-253032 | 9/1997 |
| JP | 10505253 | 5/1998 |
| JP | 10-508790 | 9/1998 |
| JP | 2001-520918 | 11/2001 |
| JP | 2002-028224 | 1/2002 |
| JP | 2003024833 A | 1/2003 |
| JP | 2003-126026 | 5/2003 |
| JP | 2004/521677 | 7/2004 |
| JP | 2004-535246 | 11/2004 |
| JP | 2005270372 | 6/2005 |
| JP | 3719608 | 11/2005 |
| JP | 2007-529280 A | 10/2007 |
| JP | 2009-530051 | 8/2009 |
| JP | 2011/508588 | 3/2011 |
| JP | 2011-519679 A | 7/2011 |
| JP | 2011/235962 | 11/2011 |
| JP | 2012/513284 | 6/2012 |
| JP | 2012-5277974 | 11/2012 |
| JP | 5502801 | 5/2014 |
| JP | 5631332 | 11/2014 |
| JP | 5670439 | 12/2014 |
| JP | 2016/512069 A | 4/2016 |
| JP | 6047546 | 11/2016 |
| JP | 6552115 | 7/2019 |
| JP | 2020/517399 | 6/2020 |

(56) References Cited

FOREIGN PATENT DOCUMENTS

| | | |
|---|---|---|
| JP | 6715274 B2 | 7/2020 |
| JP | 6807742 | 12/2020 |
| JP | 2020 023110 | 2/2022 |
| JP | 2022/521497 A | 4/2022 |
| JP | 2022-551509 | 9/2022 |
| KR | 102387327 | 4/2022 |
| KR | 10-2023-0002873 | 5/2023 |
| SU | 978999 | 12/1982 |
| TW | 1719844 B | 2/2021 |
| WO | WO 1982/03545 | 10/1982 |
| WO | WO2008/023545 | 10/1982 |
| WO | WO1985/002346 | 6/1985 |
| WO | WO1992/020312 | 11/1992 |
| WO | WO1994/028798 | 12/1994 |
| WO | WO 1995/19799 | 7/1995 |
| WO | WO 1996/009085 | 3/1996 |
| WO | WO1996/025190 | 8/1996 |
| WO | WO 1996/00524 | 11/1996 |
| WO | WO1996/037245 | 11/1996 |
| WO | WO1996/040327 | 12/1996 |
| WO | WO1997/020585 | 6/1997 |
| WO | WO 1999/12595 | 3/1999 |
| WO | WO 1999/21599 | 5/1999 |
| WO | WO 02/055139 | 7/2002 |
| WO | WO2002/053014 | 7/2002 |
| WO | WO 2003/007797 A1 | 1/2003 |
| WO | WO2004/002551 | 1/2004 |
| WO | WO2004/073863 | 9/2004 |
| WO | WO2005/089472 | 9/2005 |
| WO | WO2005/100980 | 10/2005 |
| WO | WO 2006/048536 | 5/2006 |
| WO | WO 2006/090149 | 8/2006 |
| WO | WO 2007/112185 A1 | 10/2007 |
| WO | WO2008/008845 | 1/2008 |
| WO | WO 2009/088576 | 7/2009 |
| WO | WO2009/091549 | 7/2009 |
| WO | WO 2009/137438 | 11/2009 |
| WO | WO2009/137438 A2 | 11/2009 |
| WO | WO 2010//074949 | 7/2010 |
| WO | WO 2010/088146 | 8/2010 |
| WO | WO 2010/138703 | 12/2010 |
| WO | WO 2012/118466 | 9/2012 |
| WO | WO2013/093798 | 6/2013 |
| WO | WO 2014/099662 | 6/2014 |
| WO | WO 2014/149617 | 9/2014 |
| WO | WO 2015/050814 | 4/2015 |
| WO | WO2016/038593 A1 | 3/2016 |
| WO | WO 2016/111373 | 7/2016 |
| WO | WO 2017/006684 | 1/2017 |
| WO | WO 2017/028701 A1 | 2/2017 |
| WO | WO 2018/200695 | 1/2018 |
| WO | WO2018/200695 A1 | 1/2018 |
| WO | WO 2020/254447 | 12/2020 |
| WO | WO 2021/071751 | 4/2021 |
| WO | WO2021/071751 A1 | 4/2021 |
| WO | WO 2021/141791 A1 | 7/2021 |
| WO | WO 2021/247850 | 12/2021 |
| WO | WO2021/247850 A1 | 12/2021 |
| WO | WO2023/287654 A1 | 1/2023 |
| WO | WO 2023/076076 A1 | 5/2023 |

OTHER PUBLICATIONS

International Preliminary Report on Patentability and Written Opinion regarding PCT/US2022/036498 dated Jan. 25, 2024, 9 pages.
Cardinal IP Services, "Prevention of Spray Activation During System Closure" (DN-9175) Patentability Search of Disclosure, 13 pages, dated Sep. 30, 2020.
Cardinal IP Services, "Water Ingress Prevention Via Positive (Active/Passive) Air Flow" (DN-9171 and DN-9184) Patentability Search of Disclosure, 15 pages, dated Jan. 13, 2021.
Cardinal IP Services, "Preventing Accidental Powder Deployment" (DN-9387) Patentability Search of Disclosure, 9 pages, dated Nov. 9, 2021.
Cardinal IP Services, "Positive Pressure Delivery Mechanism for a Therapeutic Agent Delivery Device" (DN-9347) Patentability Search of Disclosure, 13 pages, dated Oct. 12, 2021.
Cardinal IP Services, "Catheter Distal End Features to Prevent Lens Irrigation Fluid Ingress" (DN-9378) Patentability Search of Disclosure, 16 pages, dated Nov. 5, 2021.
Cardinal IP Services, "Device That Allows for Cleaning of Catheter and Camera Lens on Endoscope Distal Tip" (DN-9495) Patentability Search of Disclosure, 11 pages, dated Jan. 3, 2022.
PCT International Search Report in related Application No. PCT/US2022/036498 dated Oct. 27, 2022 (15 pages).
Partial European Search Report in EP Application No. 232044008, dated Mar. 18, 2024 (17 pages).
Office Action in Japanese Patent Application No. 2022-570158, dated Nov. 17, 2023 (9 pages).
Machine Translation of JP 1997-253032 (21 pages).
Partial European Search Report in EP Application No. 232144352, dated Apr. 23, 2024 (14 pages).
Medgadget, *Convesaid, A Hemostat Powder Spray That Can't Cause Embolisms*, (Team Consulting) March 16, 2018 (4 pages).
Hemospray® Endoscopic Hemostat: https://www.cookmedical.com/products/35a4a7f2-867b-4c81-a983-44ea06277852/; date visited Sep. 30, 2020.
Japanese Decision of Refusal and English Translation of the Office Action Regarding 2022-570158, dated Jul. 23, 2024 (5 pages).
Office Action for Japanese Patent Application No. 2011-508588, dated Mar. 25, 2014 (6 pages) including English Translation.
Office Action for Japanese Patent Application No. 2011-508588, dated Jun. 12, 2013 (6 gages) including English Translation.
Response to Office Action dated Oct. 10, 2013 for Japanese Patent Application No. 2011-508588 (3 pages).
Examination Report from European Patent Office dated Nov. 28, 2013 for European Patent Application No. 09743424.5 (6 pages).
Examiner's Report dated Aug. 17, 2012 for Canadian Patent Application No. 2723183 (2 pages).
Response to Examiner's Report dated Feb. 11, 2013 for Canadian Patent Application No. 2723183 (5 pages).
Notice of Allowance dated Jul. 31, 2013 for Canadian Patent Application No. 2723183 (1 page).
Notice of Acceptance dated Apr. 2, 2013 for Australian Patent Application No. 2009244462 (3 pages).
Certificate of Grant dated Jul. 25, 2013 for Australian Patent Application No. 2009244462 (1 page).
Office Action dated Oct. 2, 2014 for U.S. Appl. No. 12/435,574 (10 pages).
Response to Office Action filed Feb. 24, 2015 for U.S. Appl. No. 12/435,574 (18 pages).
Office Action dated Jun. 12, 2015 for U.S. Appl. No. 12/435,574 (10 pages).
Response to Office Action filed Oct. 6, 2015 for U.S. Appl. No. 12/435,574 (19 pages).
Office Action dated Jun. 1, 2016 for U.S. Appl. No. 12/435,574 (13 pages).
Response to Office Action filed Aug. 2, 2016 for U.S. Appl. No. 12/435,574 (13 pages).
Office Action dated Nov. 15, 2016 for U.S. Appl. No. 12/435,574 (15 pages).
Notice of Allowance dated Aug. 10, 2017 for U.S. Appl. No. 12/435,574 (9 pages).
PCT International Search Report and Written Opinion for PCT/US2009/042781, mailed Dec. 7, 2009 (16 pages).
Final Rejection for U.S. Appl. No. 13/351,524 issued Jun. 14, 2013 (12 pages).
RCE and Amendment for U.S. Appl. No. 13/351,524, filed Dec. 13, 2013 (10 pages).
Notice of Allowance for U.S. Appl. No. 13/351,524 issued Jan. 17, 2014 (9 pages).
Examination Report No. 1 for Australian Patent Application No. 2010253997 dated Mar. 15, 2013 (3 pages).
Examiner's Report for Canadian Patent Application 2,763,135 issued May 27, 2013 (3 pages).
Response to Examiner's Report for Canadian Patent Application No. 2,763,135 filed Nov. 27, 2013 (8 pages).

(56) References Cited

OTHER PUBLICATIONS

Communication for European Patent Application 10722265.5 dated Jan. 27, 2012 (2 pages).
Reply to Communication for European Patent Application No. 10722265.5 filed Jul. 27, 2012 (18 pages).
International Search Report and Written Opinion for PCT/US2013/075005 dated May 2, 2014 (13 pages).
Office Action dated Oct. 7, 2013 for U.S. Appl. No. 13/725,206, 8 pgs.
Response to Office Action filed Feb. 6, 2014 for U.S. Appl. No. 13/725,206, 8 pgs.
Office Action dated May 29, 2014 for U.S. Appl. No. 13/725,206, 10 pgs.
Pre-Appeal Brief Request for Review filed Oct. 28, 2014for U.S. Appl. No. 13/725,206, 7 pgs.
Notice of Panel Decision dated Nov. 25, 2014 for U.S. Appl. No. 13/725,206, 2 pgs.
Amendment and Response After Final filed Jan. 26, 2015 for U.S. Appl. No. 13/725,206, 9 pgs.
Advisory Action dated Feb. 13, 2015 for U.S. Appl. No. 13/725,206, 3 pgs.
Amendment and Response After Final filed Mar. 30, 2015 for U.S. Appl. No. 13/725,206, 8 pgs.
Notice of Allowance dated Apr. 9, 2015 for U.S. Appl. No. 13/725,206, 8 pgs.
Communication Pursuant to Rules 161(1) and 162 EPC for EP013818576.4, dated Aug. 12, 2015 (2 pages).
Notification of Reason for Rejection, including English translation, in P2014-254907 dated Feb. 9, 2016 (6 Pages).
Office Action in European Application No. 22802397 dated Jun. 5, 2024 (23 pages).
Final Office Action in U.S. Appl. No. 17/227,635 dated Aug. 30, 2024 (39 pages).
Final Office Action in U.S. Appl. No. 18/143,844 dated Sep. 4, 2024 (68 pages).
Extended European Search Report in European Application No. 23214435.2, dated Aug. 5, 2024 (14 pages).
Notice of Allowance in U.S. Appl. No. 17/338,198, dated Sep. 9, 2024 (10 pages).
Office Action dated Aug. 4, 2010 for U.S. Appl. No. 12/435,574, 7 pgs.
Response to Office Action for U.S. Appl. No. 12/435,572, filed Nov. 3, 2010, 10 pgs.
Office Action dated Feb. 17, 2011 for U.S. Appl. No. 12/435,574, 8 pgs.
Response to Office Action for U.S. Appl. No. 12/435,574, filed May 13, 2011, 11 pgs.
Office Action dated Aug. 22, 2011 for U.S. Appl. No. 12/435,574, 9 pgs.
Response to Office Action for U.S. Appl. No. 12/435,574, filed Nov. 22, 2011, 10 pgs.
Office Action dated Mar. 30, 2012 for U.S. Appl. No. 12/435,574, 9 pgs.
Response to Office Action for U.S. Appl. No. 12/435,574, filed Aug. 30, 2012, 11 pgs.
Restriction Requirement dated May 25, 2012 for U.S. Appl. No. 12/633,027, 7 pgs.
Response to Restriction Requirement filed Jul. 2, 2012 for U.S. Appl. No. 12/633,027, 7 pgs.
Office Action dated Apr. 14, 2011 for U.S. Appl. No. 12/787,796, 9 pgs.
Response to Office Action filed Jul. 14, 2011 for U.S. Appl. No. 12/787,796, 11 pgs.
Notice of Allowance dated Oct. 18, 2011 for U.S. Appl. No. 12/787,796, 10 pgs.
International Search Report and Written Opinion for PCT/US2009/067076, mailed Apr. 14, 2010, 23 pgs.
International Search Report and Written Opinion for PCT/US2010/036381, mailed Aug. 20, 2010, 16 pgs.
International Preliminary Report on Patentability for PCT/US2009/042781, mailed Nov. 18, 2010, 10 pgs.
International Search Report completed Sep. 22, 2009 for PCT/US2009/042781, 7 pgs.
Alto Shooter Catalog, Kaigen, English and Japanese, Jun. 1994, 8 pgs.
Decker, "An Efficient Method for the Application of Avitene Hemostatic Agent", Surgery, Gynecology & Obstetrics, 1991, vol. 172, No. 6, 2 pgs.
Endo-Avitene™ Brochure "Microfibrillar Collagen Hemostat in an Endoscopic Delivery System", from MedChem Products, 4 pgs, 1992.
Fagelman, et al. "A Simple Method for Application of Microfibrilar Colagen", Surgery, Gynecology & Obstetrics, Jun. 1980, vol. 150, No. 6, 3 pgs.
Hoshino, et al. "Trans-endoscopic Drug Propulsion Therapy", Diagnostic Endoscopy, 1993, vol. 5, 6 pgs.
Surgical Armamentarium, Copyright 1973 V. Mueller, 3 pgs.
Hoshino, "Transendoscopic Projectile Drug Delivery", Gastroenterologia Japonica, vol. 25, No. 5, Jun. 15, 1990, 1 page.
Park et al., "A randomized comparison of a new flexible bipolar hemostasis forceps designed principally for NOTES versus a conventional surgical laparoscopic bipolar forceps for intra-abdominal vessel sealing in a porcine model", Gastrointestinal Endoscopy 2010, vol. 71, No. 4, pp. 835-841.
Fritscher-Ravens et al., "Beyond NOTES: randomized controlled study of different methods of flexible endoscopic hemostasis of artifically induced hemorrhage, via NOTES access to the peritoneal cavity", Endoscopy 2009, vol. 41, pp. 29-35.
Final Office Action for U.S. Appl. No. 12/435,574 mailed Feb. 17, 2011, 8 pgs.
Examiner Interview Summary for U.S. Appl. No. 12/435,574 dated Jun. 10, 2011, 3 pgs.
Notice of Appeal for U.S. Appl. No. 12/435,574, filed Aug. 17, 2011, 1 pg.
Notice of Allowance dated Oct. 5, 2012 for U.S. Appl. No. 12/633,027, 9 pgs.
International Preliminary Report on Patentability for PCT/US2009/067076 issued Jun. 29, 2011, 12 pgs.
International Preliminary Report on Patentability for PCT/US2010/036381 issued Nov. 29, 2011, 7 pgs.
Examination Report for Australian Patent Application No. 2009244462 issued Sep. 27, 2012; 4 pgs.
Response to Examination Report for Australian Patent Application No. 2009244462 filed Feb. 19, 2013; 8 pgs.
Examination Report for Canadian Patent Application No. 2,723,183 issued Aug. 17, 2012, 2 pgs.
Response to Examination Report for Canadian Patent Application No. 2,723,183 filed Feb. 11, 2013, 5 pgs.
Examination Report for European Patent Application No. 09743424.5 issued Nov. 14, 2011, 5 pgs.
Response to Examination Report for European Patent Application No. 09743424.5 filed Mar. 14, 2012, 10 pgs.
Examination Report for European Patent Application No. 09743424.5 issued Sep. 5, 2012, 6 pgs.
Response to Examination Report for European Patent Application No. 09743424.5 filed Feb. 22, 2013, 4 pgs.
Office Action for U.S. Appl. No. 13/351,524 issued Oct. 18, 2012, 14 pgs.
Examiner Interview Summary for U.S. Appl. No. 13/351,524 issued Feb. 8, 2013, 4 pgs.
Response to Office Action for U.S. Appl. No. 13/351,524, filed Feb. 12, 2013, 9 pgs.
First Australian Examination Report for related AU Application No. 2014329827, dated Aug. 29, 2016, 4 pqs.
Reply to First Australian Examination Report for related AU Application No. 2014329827, dated Nov. 10, 2016, 16 pqs.
Notice of Acceptance For Patent Application for related AU Application No. 2014329827, dated Dec. 12, 2016, 3 pgs.
Canadian Examination Report for related CA Application No. 2,925,900, dated Feb. 23, 2017, 4 pgs.
European Communication Pursuant to Rule 161 (1) and 162 for related EP Application No. 14789657.5, dated May 11, 2016, 2 pgs.

(56) References Cited

OTHER PUBLICATIONS

Reply to European Communication Report, dated Nov. 10, 2016, 8 pgs.
PCT International Search Report and Written Opinion for related Application No. PCT/US2014/058016, dated Apr. 21, 2015, 15 pgs.
Office Action for JP2016-520011 dated May 2, 2017, 7 pgs. Including English translation.
John Chadwick, Particle Size Control in Aerosol Packages, Dec. 2004, Aerosol Technical Solutions, pp. 1-3.
Response to Examiner's Report in Canadian Application No. 2,925,900, dated Aug. 23, 2017, 6 pages.
Notice of Allowance in Canadian Application No. 2,925,900, dated Dec. 1, 2017, 1 page.
Office Action/Notification of Reason for Rejection in Japanese Application No. 2016-520011 dated Apr. 24, 2018, including English translation, 7 pages.
Office Action in Chinese Application No. 201480065570.7 dated Jun. 22, 2018, including English translation, 21 pages.
Response to Office Action for Chinese Application No. 201480065570.7 filed Oct. 5, 2018, including English translation, 6 pgs.
Response to Office Action for Canadian Application No. 2,925,900 filed Aug. 23, 2017, 32 pgs.
Response to Office Action for Japanese Application No. 2016-520011 filed Nov. 1, 2017, 11 pgs.
Response to Office Action for Japanese Application No. 2016-520011 filed Oct. 23, 2018, 3 pgs.
Office Action for EP 13818576.4 issued Oct. 9, 2018, 6 pgs.
Second Office Action for CN201480065570.7 dated Mar. 11, 2019, 7 pages.
Office Action for Japanese Patent Application 2016-520011 dated Apr. 2, 2019, 5 pgs. including English translation.
Response to Office Action for Japanese Patent Application 2014-80065570.7 filed May 22, 2019, 11 pgs.
Intent to Grant for European Application 14 789 657.5 dated Jun. 17, 2019, 35 pgs.
Third Office Action for Chinese Patent Application No. 201480065570.7 dated Sep. 25, 2019, 14 pgs. including English translation.
Office Action for Japanese Patent Application Serial No. 2016-520011 (Appeal No. 2019-010225), dated Jun. 24, 2020, 8 pgs; including English translation.
Office Action for Chinese Patent Application filing No. 201480065570.7 dated Apr. 3, 2020, 7 pgs. including English translation.
Notice of Opposition for European Patent Application No. 14789657.5 dated Aug. 26, 2020, 28 pgs.
ASTM, "ASTM E2651-10, Standard Guide for Powder Particle Size Analysis", West Conshohocken, PA, USA: ASTM International, 2010.
Muzzio, F.J. et al., "Sampling and characterization of pharmaceutical powders and granular blends", International Journal of Pharmaceutics, vol. 250, No. 51-64, 2003.
Kuchling, H., "Taschenbuch der Physik", Fachbuchverlag Leipzig GmbH, 1995, Ed. 15: pp. 166-169; 9 pages including English translation.
Kibbe, A.H. et al., "Lactose. In: R.C. Rowe et al. (eds). Handbook of Pharmaceutical Excipients", London: Pharmaceutical Press, 2003: pp. 323-332.
National Geographic Area Coordination Center, "Weed Washer' What is a Micron? (Micron v/s Mesh). Reference: Mesh Micron Conversion Chart", [cited Jun. 8, 2020] Available from: [https://gacc.nifc.gov/nrcc/dispatch/equipment_supplies/agree-contract/forms/M icronMesh.pdf].
Mortazavi, S.M.J., "Development of a Novel Mineral Based Haemostatic Agent Consisting of a Combination of Bentonite and Zeolite Minerals", J Ayub Med Coll Abbottabad, vol. 21(1), 2009.
ChemicalBook Inc., "Chemical Book, CAS DataBase List, Bentonite", CAS No. 1302-78-9 II, [cited Jun. 8, 2020] Available from: [https://www.chemicalbook.com/CASEN_1302-78-9.htm].
Kesavan, J. et al., "Density Measurements of Materials used in Aerosol Studies", Edgewood, 2000.
Arefnia, A. et al., "Comparative Study on the Effect of Tire-Derived Aggregate on Specific Gravity of Kaolin", Electronic Journal of Geotechnical Engineering, vol. 18(B), Jan. 2013: pp. 335-344.
Wikipedia, "Wikipedia. Amoxicillin", [cited Jun. 8, 2020] Available from: [https://en.wikipedia.org/wiki/Amoxicillin].
ChemicalBook Inc., "Chemical Book. Norfloxacin", [cited Jun. 8, 2020] Available from: [https://www.chemicalbook.com/ChemicalProductProperty_US_CB1711035.aspx].
Wong Kee Song, L.-M. et al., "Emerging technologies for endoscopic hemostasis", Gastrointest. Endosc., vol. 75(5), May 2012: pp. 933-937.
Bridevaux, et al. "Short-term safety of thoracoscopic talc pleurodesis for recurrent primary spontaneous pneumothorax; a prospective European multicentre study" Eur Respir J 2011; 38: 770-773. (Year: 2011).
International Preliminary Report on Patentability in PCT Application No. PCT/US/2014/058016, dated Oct. 2, 2013 (12 pages).
Reexamination Request in Chinese Application No. 201480065570.7, dated Jul. 3, 2020 (10 pages).
Notice of Allowance in Chinese Application No. 201480065570.7, dated Aug. 12, 2020 (4 pages).
Response to Office Action in European Application No. 14789657.5, dated Mar. 22, 2021 (85 Pages).
Response to Office Action in Japanese Application No. 2016-520011, dated Sep. 15, 2020 (4 pages).
Decision on Appeal in Japanese Application No. 2016-520011, dated Nov. 10, 2020 (4 pages).
Summons to Attend Oral Proceedings in European Application No. 14789657.5, dated Aug. 28, 2021 (13 pages).
PCT invitation to Pay Additional Fees in Related Application No. PCT/U802021/035682 dated Oct. 12, 2021 (16 pages).
First Office Action and English Translation in Chinese Application No. 2018800357848, dated Jun. 9, 2021 (9 pages).
Response to First Office Action in Chinese Application No. 2018800357848, dated Sep. 17, 2021 (12 gages).
Second Office Action and English Translation in Chinese Application No. 2018800357848, dated Dec. 1, 2021 (8 pages).
Response to Second Office Action in Chinese Application No. 2018800357848, dated Mar. 29, 2022 (9 pages).
Third Office Action and English Translation in Chinese Application No. 2018800357848, dated Mar. 29, 2022 (9 pages).
Response to Examination Report in European Application No. 18724076.7, dated Feb. 25, 2022 (12 pages).
Written Submissions in European Application No. 14789657.5 filed Jan. 7, 2022 (51 pages).
Opponent's Written Submissions in European Application No. 14789657.5 filed Jan. 18, 2022 (25 pages).
First Office Action in Chinese Patent Application No. 2020111614040 dated Mar. 21, 2022 (15 pages).
International Search Report and Written Opinion of the International Searching Authority dated Dec. 3, 2021 in International Application No. PCT/US2021/035682 (22 pages).
Communication and Written Opinion dated Jan. 13, 2023 in European Application No. 21736099.9 (14 pages).
Patentability Search: "Review of Cook's Hemostatic and Mucoadhesive Patents" dated Feb. 14, 2023 (32 pages).
Patentability Search of Disclosure Entitled "Device That Reduces Fluid Ingress in the Catheter" (DN-9596) Prepared by Cardinal IP Services, dated Aug. 24, 2022 (12 pages).
Invitation to Pay Additional Fee and, Where Applicable, Protest Fee in PCT Application Serial No. PCT/US2022/047013, dated Feb. 6, 2023 (13 pages).
Hemospray Endoscopic Hemostat Brochure, Cook, Jun. 2018 ESC-D43196-EN-F.
International Preliminary Report on Patentability in PCT Application No. PCT/US/2021/035682, dated Dec. 6, 2022 (13 pages).
International Search Report and The Written Opinion of the International Searching Authority, dated Mar. 27, 2023 (20 pages).

* cited by examiner

SYSTEMS AND METHODS FOR PREVENTING CLOGGING OF A DELIVERY SYSTEM

CROSS-REFERENCE TO RELATED APPLICATIONS

This application claims priority from U.S. Provisional Application No. 63/221,721, filed Jul. 14, 2021, the entirety of which is hereby fully incorporated by reference herein.

BACKGROUND

The present embodiments relate generally to medical devices, and more particularly, to medical devices for delivering therapeutic agents to a target site.

There are several instances in which it may become desirable to introduce therapeutic agents into the human or animal body. For example, therapeutic drugs or bioactive materials may be introduced to achieve a biological effect. The biological effect may include an array of targeted results, such as inducing hemostasis, sealing perforations, reducing restenosis likelihood, or treating cancerous tumors or other diseases.

Many of such therapeutic agents are injected using an intravenous (IV) technique and via oral medicine. While such techniques permit the general introduction of medicine, in many instances it may be desirable to provide localized or targeted delivery of therapeutic agents, which may allow for the guided and precise delivery of agents to selected target sites. For example, localized delivery of therapeutic agents to a tumor may reduce the exposure of the therapeutic agents to normal, healthy tissues, which may reduce potentially harmful side effects.

Localized delivery of therapeutic agents has been performed using catheters and similar introducer devices. By way of example, a catheter may be advanced towards a target site within the patient, then the therapeutic agent may be injected through a lumen of the catheter to the target site. Typically, a syringe or similar device may be used to inject the therapeutic agent into the lumen of the catheter. However, such a delivery technique may result in a relatively weak stream of the injected therapeutic agent.

Moreover, it may be difficult or impossible to deliver therapeutic agents in a targeted manner in certain forms, such as a powder form, to a desired site. For example, if a therapeutic powder is held within a syringe or other container, it may not be easily delivered through a catheter to a target site in a localized manner that may also reduce potentially harmful side effects.

SUMMARY

One general aspect of the present disclosure includes a system suitable for delivering a therapeutic agent to a target site, the system including: a container for holding a therapeutic agent; a pressure source having pressurized fluid, the pressure source in selective fluid communication with at least a portion of the container; a catheter in selective fluid communication with the container and configured for delivery of the therapeutic agent to a target site; a first valve connected between the container and the catheter; a second valve connected between the pressure source and the container; a button configured to selectively actuate the second valve; and a brake assembly coupled to the first valve and configured to selectively permit actuation of the second valve, such that when the first valve is in a first state, the brake assembly blocks the button such that the button does not actuate the second valve, and when the first valve is in a second state, the brake assembly allows the button to be pressed to actuate the second valve, allowing the pressurized fluid in the pressure source to flow through the second valve, into the container, and urge the therapeutic agent in the container through the catheter.

Another general aspect of the present disclosure includes a system suitable for delivering a therapeutic agent to a target site, the system including: a container for holding a therapeutic agent; a pressure source having pressurized fluid, the pressure source in selective fluid communication with at least a portion of the container; a catheter in selective fluid communication with the container and configured for delivery of the therapeutic agent to a target site; a first valve connected between the container and the catheter; a second valve connected between the pressure source and the container; and a button configured to selectively actuate the second valve, where when the first valve is in a first state, the button is blocked such that the button does not actuate the second valve, and where when the first valve is in a second state, the button is allowed to be pressed to actuate the second valve, allowing the pressurized fluid in the pressure source to flow through the second valve, into the container, and urge the therapeutic agent in the container through the catheter.

Another general aspect of the present disclosure includes a method suitable for delivering a therapeutic agent to a target site, the method including: actuating a pressure source having pressurized fluid, the pressure source in selective fluid communication with at least a portion of a container that holds a therapeutic agent; transitioning a first valve from a first state to a second state such that a button can be pressed to actuate a second valve connected between the pressure source and the container, the first valve being connected between the container and a catheter, the catheter in selective fluid communication with the container and configured for delivery of the therapeutic agent to a target site; and actuating the second valve, via the button, to deliver the therapeutic agent, via the pressurized fluid, through the catheter.

Other systems, methods, features and advantages of the invention will be, or will become, apparent to one with skill in the art upon examination of the following figures and detailed description. It is intended that all such additional systems, methods, features and advantages be within the scope of the invention.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENT

In the present application, the term "proximal" refers to a direction that is generally towards a physician during a medical procedure, while the term "distal" refers to a direction that is generally towards a target site within a patient's anatomy during a medical procedure.

Referring now to FIGS. 1-5, an embodiment of a system 20 suitable for delivering one or more therapeutic agents is shown. In this embodiment, the system 20 comprises a container 30 that is configured to hold a therapeutic agent 38, a catheter 90 that is configured to be placed in selective fluid communication with the container 30, and at least one pressure source 68 that is configured to be placed in selective fluid communication with at least a portion of the container 30, to deliver the therapeutic agent 38 through the catheter 90 to a target site within the patient, as explained more fully below.

The system 20 further comprises a housing 22, which is suitable for securely holding, engaging and/or covering the container 30, pressure source 68, catheter 90, and other components described below. Preferably, the housing 22 comprises an upright section 24 that may be grasped by a user and a section 25 for engaging the container 30. An actuator 26 may be engaged by a user and selectively operated to perform the functions described below.

The system 20 further comprises a first valve 43 configured to be connected between the container 30 and the catheter 90, a second valve 80 configured to be connected between the pressure source 68 and the container 30, and a button 88 configured to selectively actuate the second valve 80, as described in greater detail below.

Figure 1:
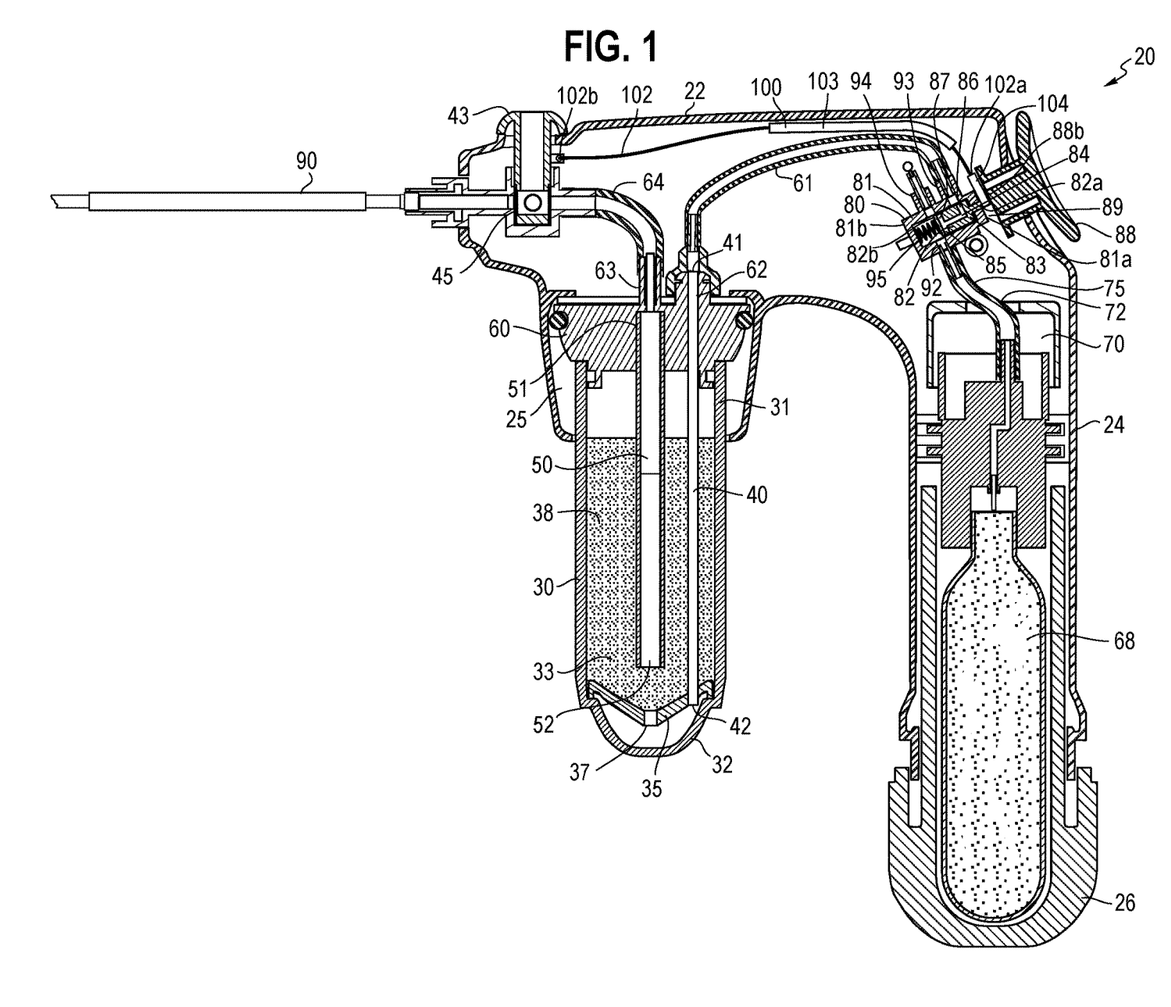
FIG. 1 is a cross-sectional view of a system for delivering therapeutic agents in accordance with an embodiment showing a first valve is in a first state and a brake assembly occupies a space between a second valve and a button.
Figure 2:
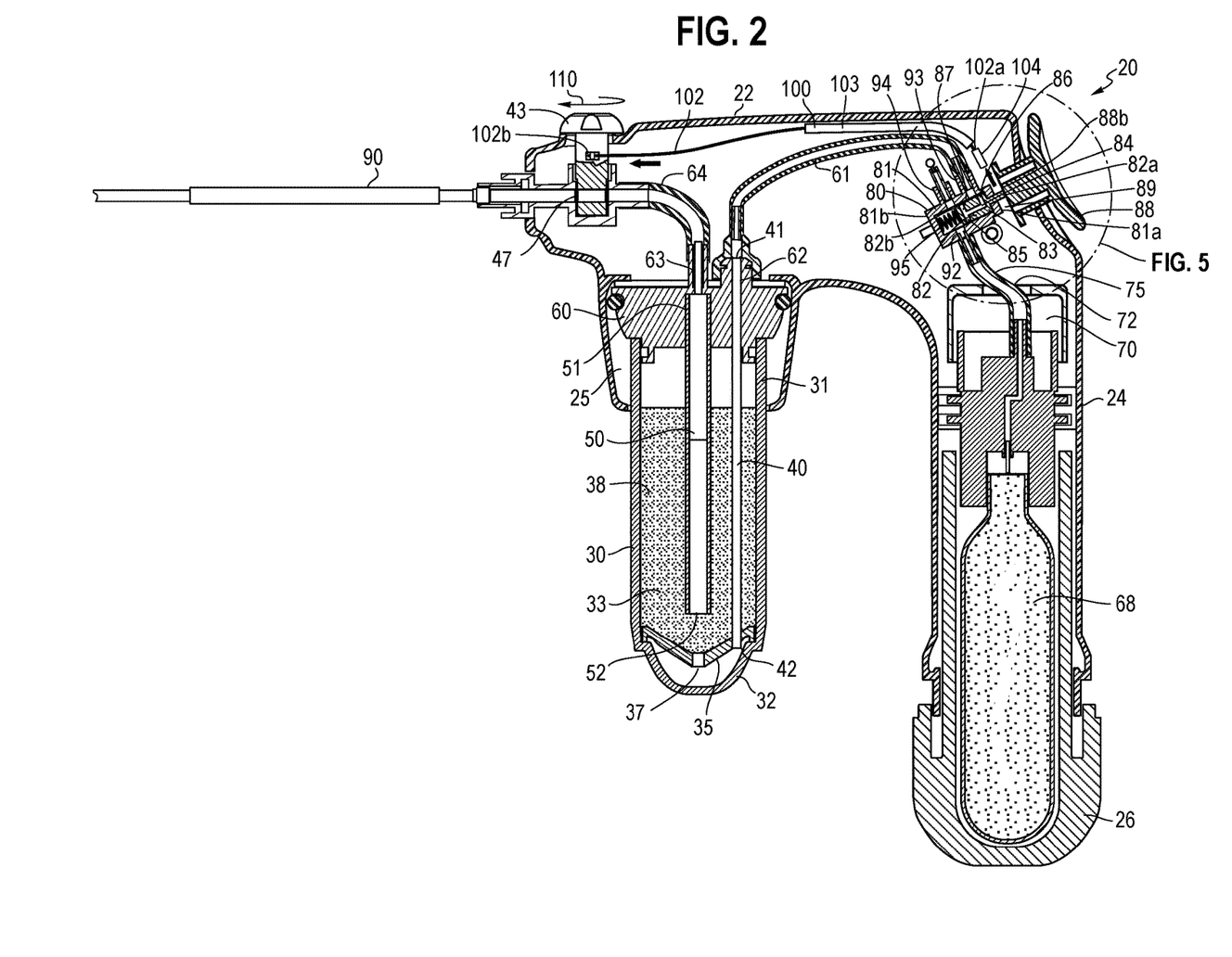
FIG. 2 is a cross-sectional view of the system of FIG. 1 showing the first valve is transitioned to a second state and the brake assembly is removed from the space between the second valve and the button.
Figure 3:
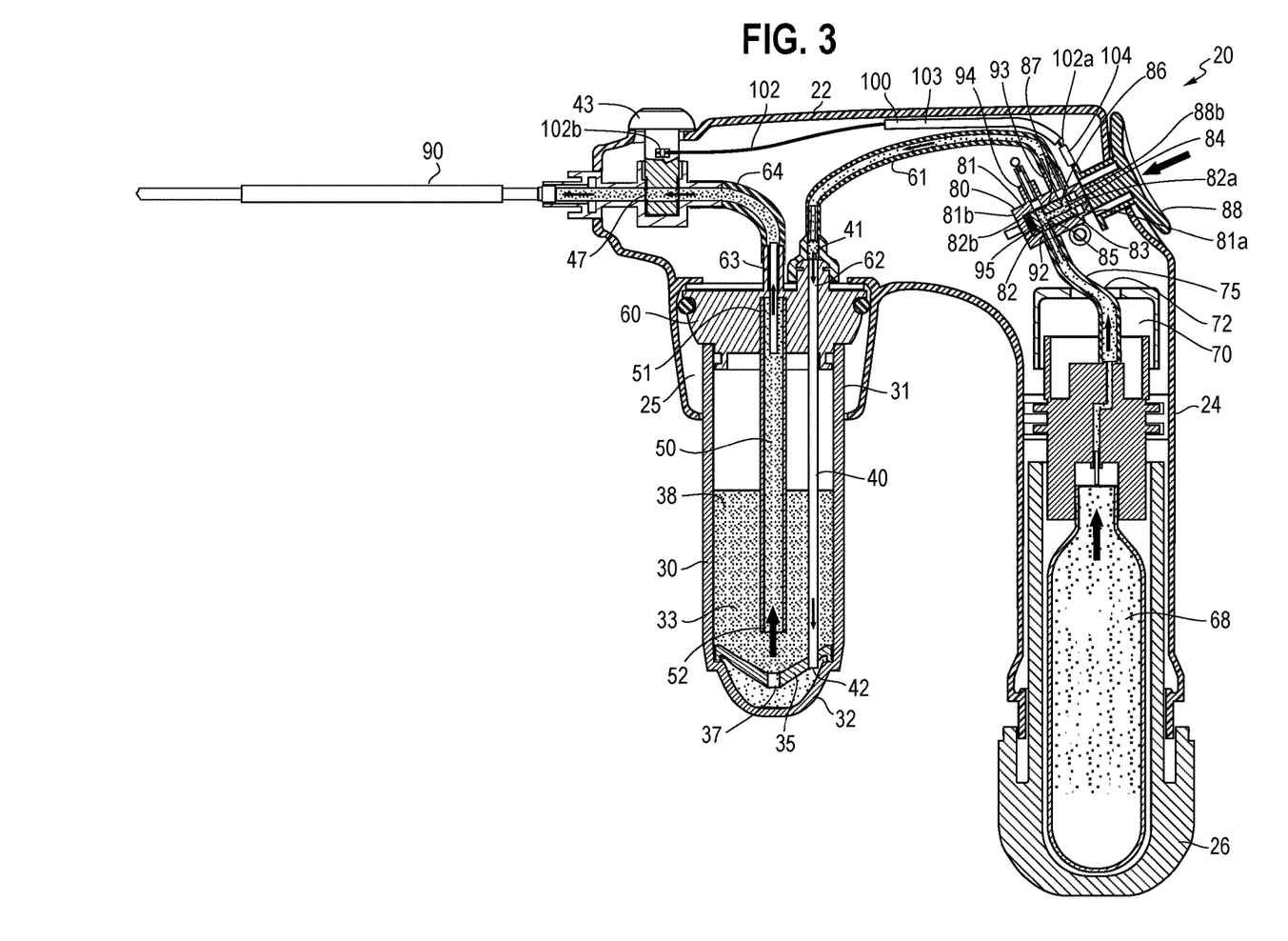
FIG. 3 is a cross-sectional view of the system of FIG. 1 showing the first valve is in the second state and the button is pressed to actuate the second valve.

The container 30 may comprise any suitable size and shape for holding the therapeutic agent 38. As shown in FIGS. 1-3, the container 30 comprises a generally tube-shaped configuration having a first region 31, a second region 32, and a reservoir 33 defined by an interior of the container 30.

The container 30 may further comprise an inlet tube 40, an outlet tube 50, and a cap 60, where the cap 60 is configured to be secured to the first region 31 of the container 30. The inlet tube 40 has first and second ends 41 and 42 with a lumen extending therebetween, while the outlet tube 50 has first and second ends 51 and 52 with a lumen extending therebetween. The first end 41 of the inlet tube 40 is placed in fluid communication with an inlet port 62 formed in the cap 60, while the first end 51 of the outlet tube 50 is placed in fluid communication with an outlet port 63 formed in the cap 60.

Figure 4A:
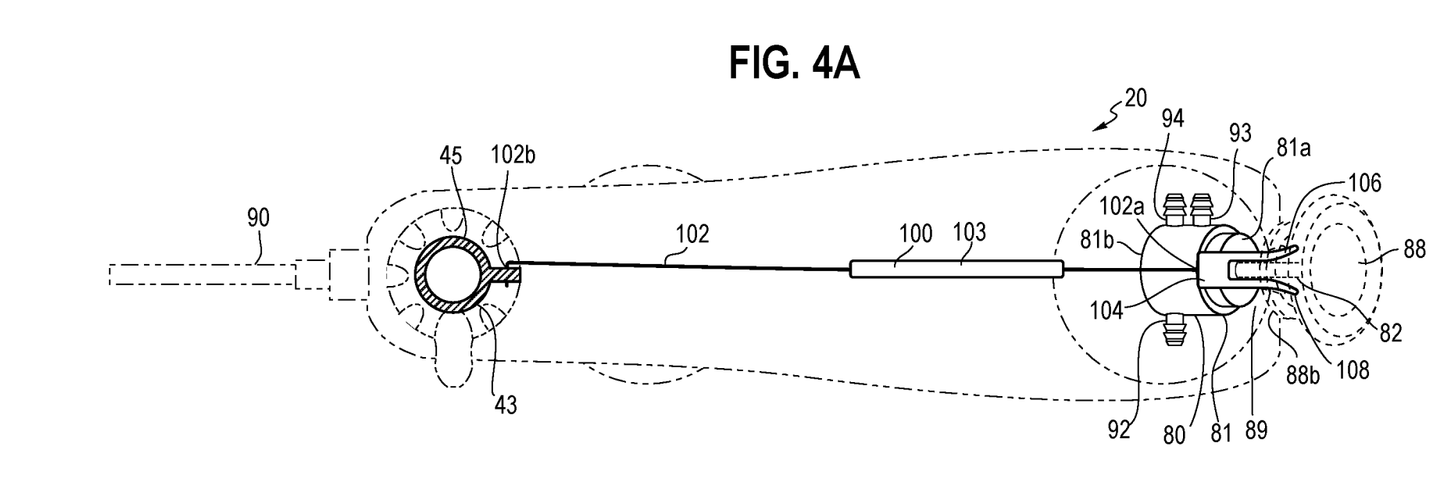
FIG. 4A is a partial perspective view of the system of FIG. 1, with a portion of a housing removed, showing the first valve is in the first state and the brake assembly occupies the space between the second valve and the button.

The outlet port 63 in the cap 60 may be placed in fluid communication with tubing 64, which extends in a distal direction and connects to the catheter 90 with the first valve 43 disposed therebetween. By manipulating the first valve 43, a user has the option to selectively deliver the therapeutic agent 38 flowing from the tubing 64 via the catheter 90. For example, the first valve 43 may be configured to have a first state 45 (e.g., a closed state) and a second state 47 (e.g., an open state). When the first valve 43 is in the first state 45 (e.g., as shown in FIGS. 1 and 4A), the catheter 90 is not in fluid communication with the tubing 64 and the container 30. When the first valve 43 is in the second state 47 (e.g., as shown in FIGS. 2, 3, 4B, and 4C), the catheter 90 is in fluid communication with the tubing 64 and the container 30. In some embodiments, the first valve 43 may be a stopcock and can be transitioned between the first state 45 and the second state 47 via rotation of at least a portion of the first valve 43, as discussed in greater detail below.

During operation, fluid passed through the inlet port 62 of the cap 60 is directed through the inlet tube 40 and into the reservoir 33. Notably, the u-shaped curvature near the second region 32 of the container 30 effectively changes the direction of the fluid flow by approximately 180 degrees, such that the fluid originally flows in a direction from the first region 31 of the container 30 towards the second region 32, and then from the second region 32 back towards the first region 31. As shown in FIGS. 1-3, the first region 31 of the container 30 is disposed vertically above the second region 32 of the container 30 during use, however, it is possible to have different placements of the first and second regions 31 and 32 relative to one another, such that they are disposed at least partially horizontally adjacent to one another.

The second end 52 of the outlet tube 50 may terminate a predetermined distance above the second region 32 of the container 30, as shown in FIGS. 1-3. Accordingly, when fluid from the pressure source 68 is redirected from the second region 32 towards the first region 31, the fluid and the therapeutic agent 38 within the reservoir 33 may be directed through the outlet tube 50, through the outlet port 63, and towards a target site. Alternatively, the outlet tube 50 may be omitted and the therapeutic agent 38 may flow directly from the reservoir 33 into the outlet port 63. Other variations on the container 30 and the outlet port 63 may be found in U.S. Pat. No. 8,118,777, which is hereby incorporated by reference in its entirety.

Optionally, a platform 35 may be positioned within the container 30 above a curved portion associated with the second region 32, where the platform 35 forms a substantially fluid tight seal with an inner surface of the container 30, thereby preventing the therapeutic agent 38 that is disposed in the reservoir 33 from reaching the curve at the second region 32, as explained further in U.S. Pat. No. 8,118,777. The platform 35 may comprise an opening 37 through which fluid from the pressure source 68 may be directed via a u-shaped tube disposed at the second region 32, as explained further in U.S. Pat. No. 8,118,777.

The cap 60 may comprise any suitable configuration for sealingly engaging the first region 31 of the container 30. In one example, an O-ring is held in place around a circumference of the cap 60 to hold the therapeutic agent 38 within the reservoir 33. The inlet and outlet tubes 40 and 50 may be held in place within the container 30 by one or more support members, such as those explained further in U.S. Pat. No. 8,118,777.

Further, the cap 60 may comprise one or more flanges that permit a secure, removable engagement with a complementary internal region of the section 25 of the housing 22. For example, by rotating the container 30, the flange of the cap 60 may lock in place within the section 25.

Advantageously, in this manner, a first container holding a first therapeutic agent may be coupled to the housing 22 for use with the system 20, and subsequently a second container holding a second composition or agent may be coupled to the housing 22 for use with the system 20. By way of example, and without limitation, in one embodiment the system 20 may be "preloaded" with a first container 30 holding a therapeutic agent in the form of a hemostatic power. At a later time, it may be deemed beneficial to deliver a mucoadhesive composition, in which case the first container 30 may be rotated to disengage its flange from the section 25 of the housing 22, and then insert a second container 30 into the section 25 of the housing 22 for delivery of the mucoadhesive composition. For the sake of brevity, the formulation in the container 30 will be referred to as a "therapeutic agent 38," although as explained herein certain formulations in a container 30 coupled to the housing 22 may be interchanged or varied and may or may not achieve a therapeutic effect per se.

The pressure source 68 may comprise one or more components capable of producing or furnishing a fluid having a desired pressure. In one embodiment, the pressure source 68 may comprise a pressurized fluid, such as a liquid or gas. For example, as shown in FIGS. 1-3, the pressure source 68 may comprise a pressurized fluid cartridge of a selected gas or liquid, such as carbon dioxide, nitrogen, or any other suitable gas or liquid that may be compatible with the human body. The pressurized fluid cartridge may contain the gas or liquid at a relatively high, first predetermined pressure, for example, around 1,800 psi inside of the cartridge. The pressure source 68 optionally may comprise one or more commercially available components.

The fluid may flow from the pressure source 68 through a pressure regulator, such as regulator valve 70 having a pressure outlet 72, which may reduce the pressure to a lower, second predetermined pressure. The actuator 26 may be actuated to release the fluid from the pressure source 68. For example, a user may rotate the actuator 26, which translates into linear motion via a threaded engagement between the actuator 26 and the housing 22. When the linear advancement is imparted to the pressure source 68, the regulator valve 70 may pierce through a seal of the pressure cartridge to release the high pressure fluid. After the regulator valve 70 reduces the pressure, the fluid may flow from the pressure outlet 72 towards the second valve 80 via tubing 75.

Figure 4B:
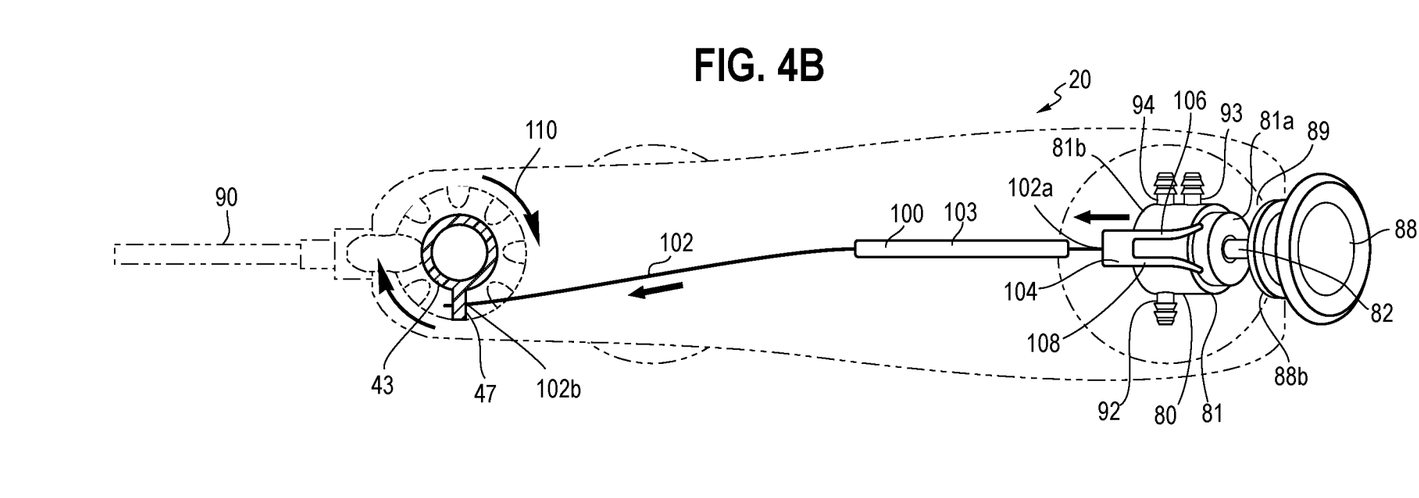
FIG. 4B is a partial perspective view of the system of FIG. 1, with a portion of a housing removed, showing the first valve is transitioned to the second state and the brake assembly is removed from the space between the second valve and the button.
Figure 5:
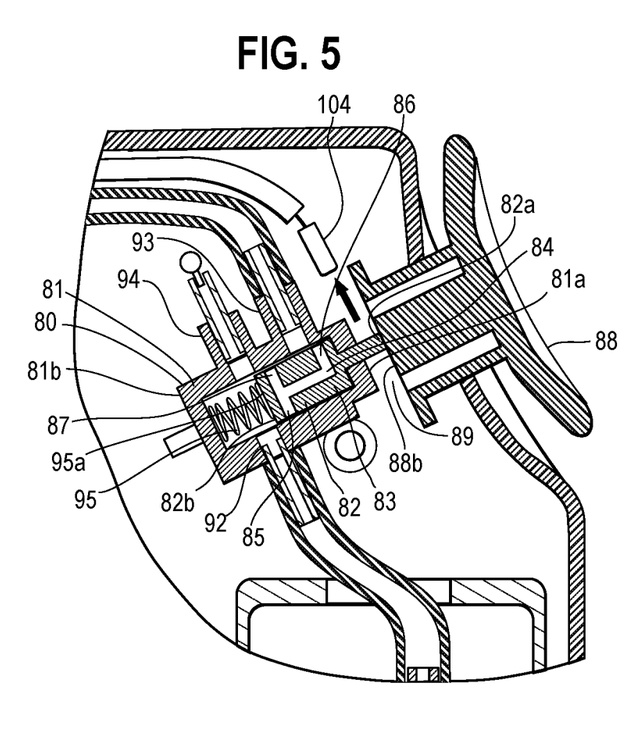
FIG. 5 is an enlarged view of a portion of the system of FIG. 2, including the button and the second valve.

The second valve 80 comprises a housing 81 having a proximal end 81a and a distal end 81b, as best seen in FIGS. 4A and 4B. A piston 82, which has proximal and distal ends 82a and 82b, is disposed at least partially within the housing 81. The proximal end 82a of the piston 82 may be coupled to the button 88, thus allowing a user to perform certain functions explained further below. This proximal end 82a of the piston 82 may extend a distance outside of the housing 81, as depicted in FIGS. 1, 2, 4A, 4B, and 5, to facilitate coupling to the button 88. The distal end 82b of the piston 82 may be positioned adjacent to a proximal end 95a of a compression spring 95 (e.g., as shown in FIG. 5). In this manner, the piston 82 can be provided with a first state (e.g., a default state, when no force is applied to the button 88) in which the piston 82 is inclined to be disposed further proximally, but if the user applies a sufficient force to the button 88 then the piston 82 can be moved distally against the force of the compression spring 95, for purposes described below.

Various inlet and outlet ports may be associated with the second valve 80. In the embodiment shown in FIGS. 1-5, an inlet port 92, and two different outlet ports 93 and 94, are associated with the second valve 80.

The inlet port 92 of the second valve 80 may be coupled to the tubing 75 extending from the pressure outlet 72 of the regulator valve 70, as depicted in FIGS. 1-3, thus providing pressurized fluid at a predetermined pressure into the second valve 80.

The piston 82 may comprise a generally tubular body 83 having a lumen 84 extending between the proximal and distal ends 82a and 82b, as best seen in FIGS. 1-3 and 5. Further, first, second, and third slots 85, 86, and 87 extend through different regions of the tubular body 83 of the piston 82, as seen in FIGS. 1-3 and 5. In this embodiment, the outlet port 94 and the third slot 87 are not in use, and a plug may be provided to block the exit of the outlet port 94, which helps ensure that during manufacturing the tubing 61 will not be accidentally connected to the outlet port 94, thereby preventing human error. In other embodiments, when needed and/or desired, the outlet port 94 may be used to establish fluid communication between the inlet port 92 and the inlet port 62 of the cap 60 via tubing 61, such that when the button 88 is moved to a corresponding state, fluid communication routes can align to permit flow from the inlet port 92 into the outlet port 94 (e.g., via the third slot 87) and into tubing 61, where it is then directed into the inlet port 62 of the cap 60 and into the container 30 holding the therapeutic agent 38.

In the embodiment as shown in FIGS. 1-3 and 5, when the button 88 is not engaged by a user, the force provided by the compression spring 95 biases the piston 82 to the first state, in which the first slot 85 of the piston 82 is axially offset from the inlet port 92, and further in which the second slot 86 of the piston 82 may or may not be axially aligned with the outlet port 93, as depicted in FIGS. 1, 2, and 5. In this manner, there is no fluid communication between the inlet port 92 and the outlet port 93, and pressurized fluid from the pressure source 68 (as regulated by the regulator valve 70) cannot be directed into the outlet port 93 or into the container 30 holding the therapeutic agent 38. As shown in FIGS. 1, 2, 4B, and 5, when the piston 82 is in the first state, the proximal end 82a of the piston 82 extends outside of the proximal end 81a of the housing 81, and a space 89 is formed between the proximal end 81a of the housing 81 and the distal end 88b of the button 88.

Figure 4C:
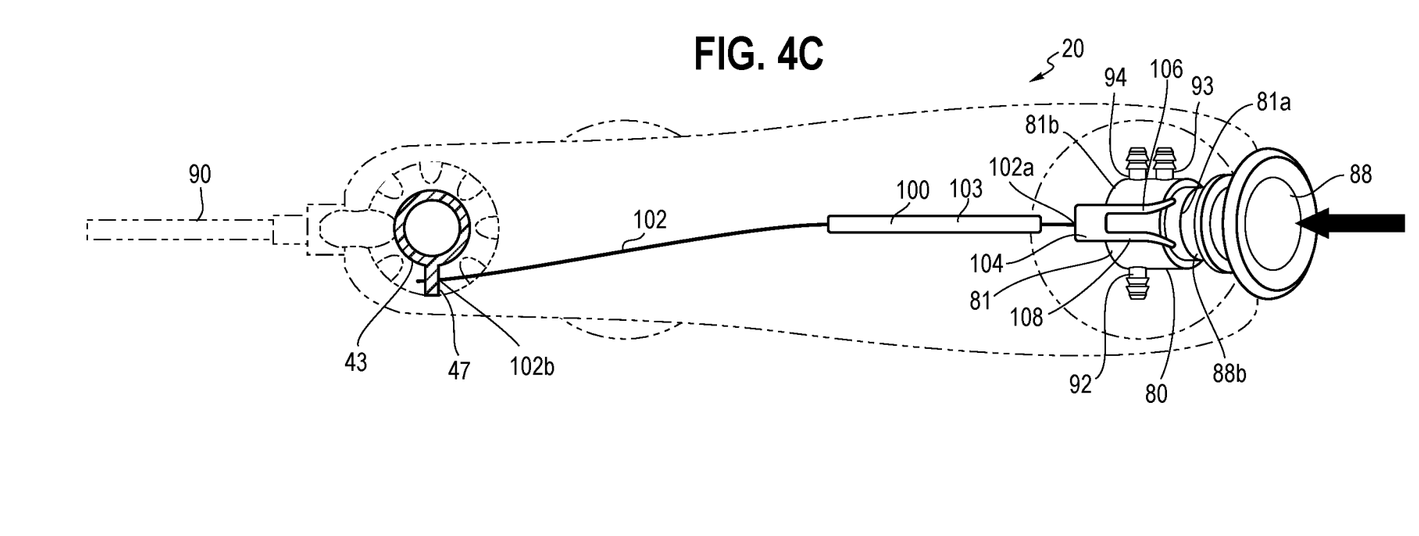
FIG. 4C is a partial perspective view of the system of FIG. 1, with a portion of a housing removed, showing the first valve is in the second state and the button is pressed to actuate the second valve.

As shown in FIGS. 3 and 4C, when the button 88 is depressed by the user in a manner to overcome the force provided by the compression spring 95, the piston 82 is advanced distally to a second state (e.g., an actuation state, where the button 88 is fully depressed), in which the space 89 between the proximal end 81a of the housing 81 and the distal end 88b of the button 88 is at least partially removed (i.e., the space 89, when not occupied, allows movement of the button 88 when the button 88 is depressed), and in which the first slot 85 of the piston 82 becomes axially aligned with the inlet port 92, while the second slot 86 of the piston 82 becomes axially aligned with the outlet port 93, thereby providing fluid communication between the inlet port 92 and the outlet port 93.

In this manner, pressurized fluid from the pressure source 68 (as regulated by the regulator valve 70) is directed into the outlet port 93 and into tubing 61, where it is then directed into the inlet port 62 of the cap 60 and into the container 30 holding the therapeutic agent 38, and where it is then directed into the outlet tube 50, into the outlet port 63 of the cap 60, and into the tubing 64, at which point, delivery of the therapeutic agent 38 can be controlled by the first valve 43, as discussed above. It will be appreciated that the number, configuration, and position of the slots on the piston 82 and the inlet and outlet ports associated with the second valve 80 may be varied, as desired and/or needed, without departing from the scope of the present invention, as long as when the piston 82 is in the first state (e.g., the default state, when no force is applied to the button 88), there is no fluid communication between the inlet port connected to the pressure source 68 and the outlet port connected to the container 30, and when the piston 82 is in the second state (e.g., the actuation state, where the button 88 is fully depressed), there is fluid communication between the inlet port connected to the pressure source 68 and the outlet port connected to the container 30.

The system 20 is also provided with a brake assembly 100, which is configured to selectively permit actuation of the second valve 80, such that when the first valve 43 is in the first state 45 (e.g., the closed state), the brake assembly 100 blocks the button 88 such that the button 88 does not actuate the second valve 80, and when the first valve 43 is in the second state 47 (e.g., the open state), the brake assembly 100 allows the button 88 to be depressed to actuate the second valve 80, allowing the pressurized fluid in the pressure source 68 to flow through the second valve 80, into the container 30, and urge the therapeutic agent 38 in the container 30 through the catheter 90, as described in greater detail below.

The brake assembly 100 is configured to connect the transitional alignment (e.g., rotational alignment) of the first valve 43 (e.g., stopcock) with the obstruction of the movement of the button 88. In this embodiment, as shown in FIGS. 1-4C, the brake assembly 100 is configured to be coupled to the first valve 43, such that when the first valve 43 is in the first state 45 (e.g., the closed state, as shown in FIGS. 1 and 4A), the brake assembly 100 occupies the space 89, preventing the button 88 to be depressed to actuate the second valve 80, and such that when the first valve 43 is in the second state 47 (e.g., the open state, as shown in FIGS. 2, 3, 4B, and 4C), the brake assembly 100 is moved away from the space 89, allowing the button 88 to be depressed to actuate the second valve 80. As discussed above, the space 89, when not occupied, allows movement of the button 88 when the button 88 is depressed to actuate the second valve 80.

Specifically, the brake assembly 100 may include a first portion 102 configured for coupling to the first valve 43 and a second portion 104 configured for selectively blocking the button 88. The brake assembly 100 is configured such that transition of the first valve 43 from the first state 45 (e.g., the closed state, as shown in FIGS. 1 and 4A) to the second state 47 (e.g., the open state, as shown in FIGS. 2, 3, 4B, and 4C) moves the second portion 104 of the brake assembly 100 away from the space 89. The brake assembly 100 is further configured such that transition of the first valve 43 from the second state 47 (e.g., the open state, as shown in FIGS. 2, 3, 4B, and 4C) to the first state 45 (e.g., the closed state, as shown in FIGS. 1 and 4A) moves the second portion 104 of the brake assembly 100 back to occupy the space 89.

In some embodiments, transition of the first valve 43 between the first state 45 and the second state 47 is achieved by rotation of the first valve 43. For example, as shown in FIGS. 2 and 4B, rotating the first valve 43 in a first direction 110 (e.g., clockwise) may transition the first valve 43 from the first state 45 (e.g., the closed state) to the second state 47 (e.g., the open state), and rotating the first valve 43 in an opposite second direction (e.g., counterclockwise; not shown) may transition the first valve 43 from the second state 47 (e.g., the open state) back to the first state 45 (e.g., the closed state).

In some embodiments, the first portion 102 of the brake assembly 100 may be a braided cable extending between a proximal end 102a and a distal end 102b, where the distal end 102b is configured to be fixed to the first valve 43 and the proximal end 102a is configured to be fixed to the second portion 104. The first portion 102 (e.g., the braided cable) is configured to retract (e.g., by forming a tighter braid) or extend (e.g., by forming a looser braid) when the first valve 43 is transitioned (e.g., rotated; as shown in FIGS. 2 and 4B). In some embodiments, as shown in FIGS. 1-4C, at least a portion of the first portion 102 may extend through an inner lumen of a guide 103. The guide 103 may be at least partially secured to the housing 22 and is configured and positioned such that the first portion 102 will be retracted or extended in a predetermined path through the inner lumen of the guide 103, allowing the second portion 104 to correspondingly be removed from or disposed in the space 89. The second portion 104 of the brake assembly 100 may be fork shaped, including a first arm 106 and a second arm 108.

The brake assembly 100 is configured such that when the first valve 43 is in the first state 45 (e.g., the closed state), the first portion 102 (e.g., the braided cable) locates the second portion 104 over at least a portion of the piston 82 of the second valve 80 with the first and second arms 106 and 108 aligned on either side of the piston 82, thereby providing even pressure to the button 88 and removing the space 89 for the button 88 to be depressed to actuate the second valve 80 and release the therapeutic agent 38. Transition (e.g., rotation) of the first valve 43 from the first state 45 (e.g., the closed state) to the second state 47 (e.g., the open state) moves the first portion 102 (e.g., the braided cable) distally and retracts the second portion 104 from the piston 82 (e.g., as shown in FIGS. 2 and 4B), thereby providing the space 89 for the button 88 to be depressed to actuate the second valve 80 (e.g., allowing the button 88 to be fully depressed such that the distal end 88b of the button 88 contacts the proximal end 81a of the housing 81 of the second valve 80, as shown in FIGS. 3 and 4C), releasing the pressurized fluid from the pressure source 68 and ejecting the therapeutic agent 38 through the catheter 90.

The first portion 102 made of a braided cable is advantageous for reducing the internal rigidity caused by the brake assembly 100 to the interaction between the button 88 and the second valve 80, making the button 88 easy to depress when the first valve 43 is in the second state 47 (e.g., the open state), thereby providing a tactile distinction between when the brake assembly 100 occupies the space 89 and when the brake assembly 100 is removed from the space 89. The fork shape of the second portion 104 is advantageous for reducing the contact area between the second portion 104 and the second valve 80, as well as the contact area between the second portion 104 and the button 88, but providing uniform brake areas on either side of the piston 82. It will be appreciated that the configuration (e.g., shape, size, length) and material of the brake assembly 100 may be varied, as desired and/or needed, without departing from the scope of the present invention, as long as the brake assembly 100 connects the transitional alignment (e.g., rotational alignment) of the first valve 43 (e.g., stopcock) with the obstruction of the movement of the button 88, such that the button 88 can be depressed to actuate the second valve 80 only when the first valve 43 is in the second state 47 (e.g., open state).

The brake assembly 100 will ensure that the therapeutic agent 38 is only ejected from the container 30 when the first valve 43 is in the second state 47 (e.g., the open state) and there is a clear pathway from the container 30 to the catheter 90. Advantageously, the brake assembly 100 provides the ability to prevent clogging caused by user error (e.g., a user presses the button 88 and actuates the second valve 80 when the first valve 43 is closed) and thus prevents the requirement for catheter replacement due to clogging. This may improve overall procedure time and customer experience, and may lead to reduced number of catheters packaged per system, hence reducing environmental burden.

In use, to deliver the therapeutic agent 38 to a target site, a user may actuate the pressure source 68, transition the first valve 43 from the first state 45 (e.g., the closed state) to the second state 47 (e.g., the open state) such that the button 88 can be pressed to actuate the second valve 80, and then actuate the second valve 80, via the button 88 (e.g., by fully depressing the button), to deliver the therapeutic agent 38, via the pressurized fluid from the pressure source 68, through the catheter 90. It will be appreciated that the sequence of actuating the pressure source 68 and transitioning the first valve 43 from the first state 45 (e.g., the closed state) to the second state 47 (e.g., the open state) may be changed, but they need to be performed before actuating the second valve 80 such that the therapeutic agent 38 can be delivered via the catheter 90.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:

1. A system suitable for delivering a therapeutic agent to a target site, the system comprising:
    a container for holding a therapeutic agent;
    a pressure source having pressurized fluid, the pressure source in selective fluid communication with at least a portion of the container;
    a catheter in selective fluid communication with the container and configured for delivery of the therapeutic agent to a target site;
    a first valve connected between the container and the catheter;
    a second valve connected between the pressure source and the container;
    a button configured to selectively actuate the second valve; and
    a brake assembly coupled to the first valve and configured to selectively permit actuation of the second valve, such that when the first valve is in a first state, the brake assembly blocks the button such that the button does not actuate the second valve, and when the first valve is in a second state, the brake assembly allows the button to be pressed to actuate the second valve, allowing the pressurized fluid in the pressure source to flow through the second valve, into the container, and urge the therapeutic agent in the container through the catheter.

2. The system of claim 1, wherein when the first valve is in the first state, the catheter is not in fluid communication with the container, and wherein when the first valve is in the second state, the catheter is in fluid communication with the container.

3. The system of claim 1, wherein when the first valve is in the first state, the brake assembly occupies a space, and wherein the space, when not occupied, allows movement of the button when the button is pressed.

4. The system of claim 3, wherein when the first valve is in the second state, the brake assembly is moved away from the space, allowing the button to be pressed to actuate the second valve.

5. The system of claim 1, wherein the first valve is a stopcock.

6. The system of claim 1, wherein the brake assembly includes a first portion configured for coupling to the first valve and a second portion configured for selectively blocking the button, wherein the brake assembly is configured such that transition of the first valve from the first state to the second state moves the second portion of the brake assembly away from a space, and wherein the space, when not occupied, allows the button to be pressed to actuate the second valve.

7. The system of claim 6, wherein the second portion of the brake assembly is fork shaped, including a first arm and a second arm.

8. A system suitable for delivering a therapeutic agent to a target site, the system comprising:
    a container for holding a therapeutic agent;
    a pressure source having pressurized fluid, the pressure source in selective fluid communication with at least a portion of the container;
    a catheter in selective fluid communication with the container and configured for delivery of the therapeutic agent to a target site;
    a first valve connected between the container and the catheter;
    a second valve connected between the pressure source and the container; and
    a button configured to selectively actuate the second valve,
    wherein when the first valve is in a first state, the button is blocked such that the button does not actuate the second valve, and
    wherein when the first valve is in a second state, the button is allowed to be pressed to actuate the second valve, allowing the pressurized fluid in the pressure source to flow through the second valve, into the container, and urge the therapeutic agent in the container through the catheter.

9. The system of claim 8, wherein when the first valve is in the first state, the catheter is not in fluid communication with the container, and wherein when the first valve is in the second state, the catheter is in fluid communication with the container.

10. The system of claim 8, further comprising a brake assembly configured to selectively permit actuation of the second valve, wherein when the first valve is in the first state, the brake assembly occupies a space, and wherein the space, when not occupied, allows movement of the button when the button is pressed.

11. The system of claim 10, wherein when the first valve is in the second state, the brake assembly is moved away from the space, allowing the button to be pressed to actuate the second valve.

12. The system of claim 10, wherein the brake assembly includes a first portion configured for coupling to the first valve and a second portion configured for selectively blocking the button, and wherein the brake assembly is configured such that transition of the first valve from the first state to the second state moves the second portion of the brake assembly away from the space.

13. The system of claim 12, wherein the second portion of the brake assembly is fork shaped, including a first arm and a second arm.

14. The system of claim 8, wherein the first valve is a stopcock.

15. A method suitable for delivering a therapeutic agent to a target site, the method comprising:
   actuating a pressure source having pressurized fluid, the pressure source in selective fluid communication with at least a portion of a container that holds a therapeutic agent;
   transitioning a first valve from a first state to a second state such that a button can be pressed to actuate a second valve connected between the pressure source and the container, the first valve being connected between the container and a catheter, the catheter in selective fluid communication with the container and configured for delivery of the therapeutic agent to a target site; and
   actuating the second valve, via the button, to deliver the therapeutic agent, via the pressurized fluid, through the catheter.

16. The method of claim 15, wherein when the first valve is in the first state, the catheter is not in fluid communication with the container, and wherein when the first valve is in the second state, the catheter is in fluid communication with the container.

17. The method of claim 15, wherein a brake assembly is coupled to the first valve and is configured to selectively permit actuation of the second valve.

18. The method of claim 17, wherein when the first valve is in the first state, the brake assembly occupies a space, wherein the space, when not occupied, allows movement of the button when the button is pressed, and wherein when the first valve is in the second state, the brake assembly is moved away from the space, allowing the button to be pressed to actuate the second valve.

19. The method of claim 17, wherein the brake assembly includes a first portion configured for coupling to the first valve and a second portion configured for selectively blocking the button, wherein the brake assembly is configured such that transition of the first valve from the first state to the second state moves the second portion of the brake assembly away from a space, and wherein the space, when not occupied, allows movement of the button when the button is pressed.

20. The method of claim 19, wherein the second portion of the brake assembly is configured to provide even pressure to the button when the first valve is in the first state.

* * * * *